Nov. 16, 1926.
L. W. BERTELSEN, JR
1,607,047
METHOD OF MAKING ARTIFICIAL CORK
Original Filed June 15, 1921
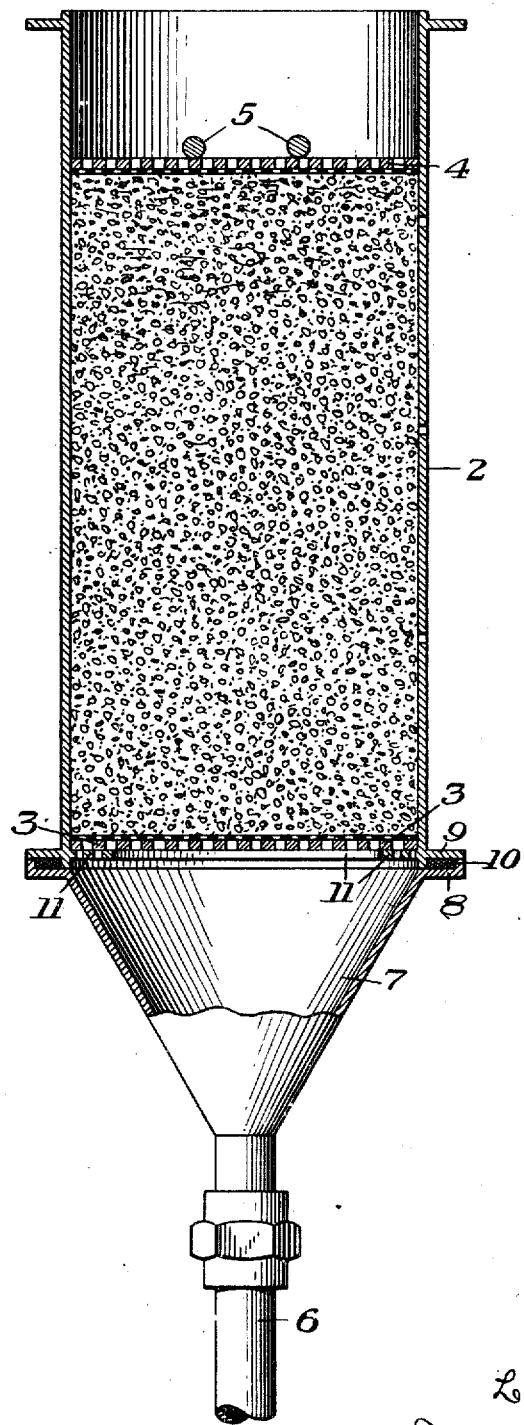
INVENTOR.

Patented Nov. 16, 1926.

1,607,047

UNITED STATES PATENT OFFICE.

LEONARD W. BERTELSEN, JR., OF BROOKLYN, NEW YORK, ASSIGNOR TO ARMSTRONG CORK COMPANY, OF PITTSBURGH, PENNSYLVANIA, A CORPORATION OF PENNSYLVANIA.

METHOD OF MAKING ARTIFICIAL CORK.

Application filed June 15, 1921, Serial No. 477,748. Renewed February 19, 1926.

My invention has relation to the manufacture of artificial cork, and particularly to shaped bodies of artificial cork formed by subjecting the cork particles to a heating operation in which the particles are expanded, and the mass shaped to the desired form.

The general practice in the manufacture of artificial cork bodies of this character has been to subject the cork particles, compressed in a suitable mold, to a baking operation, this baking operation acting to expand the cork particles and to unite them into a more or less homogeneous porous mass. It has also been proposed, instead of baking the molds containing the compressed cork, to apply the necessary heat to the cork by means of super-heated steam. Such operation, for instance, is disclosed in the patent to Grunzweig, No. 997,056, of July 4, 1911. When, however, steam is used as the heating medium, it has been supposed, as stated in the said patent, that it was necessary to leave the cork particles in loose form while passing the steam therethrough. This either required the use of separate heating and molding vessels, the molding being effected after the completion of the heating; or if the mold were used as the heating vessel it was then necessary to apply pressure, after heating, to the cork in the mold in order to shape the mass.

I have discovered that this two-stage operation is entirely unnecessary, and that a very satisfactory product can be manufactured by compressing the cork particles in the mold in the usual manner and then passing steam through the compressed mass for a sufficient time to effect the baking operation.

In the accompanying drawing I have illustrated a mold 2 in which cork particles are compressed in the usual manner, this mold having a perforated bottom wall 3 and a removable perforated top plate 4 to which the compressing pressure may be applied, and which is secured with the cork under compression in any suitable manner, as by the keys 5. The perforated plates are preferably formed of two different members having perforations of different sizes. 6 designates a steam supply pipe terminating in a funnel 7 having a surrounding flange 8 at its open end upon which the bottom flange 9 of the mold body sets, there being a gasket or packing 10 interposed between the flanges 8 and 9. The lower end portion of the mold body is also shown as having an internal perforated flange 11 upon which the bottom mold plate is supported.

The apparatus herein shown is illustrative only, as I do not limit myself to the use of any particular apparatus in carrying out my invention.

In practice, steam may be employed having a temperature of from 200° to 350° C. This steam is supplied through the pipe 6 and funnel 7, and passes upwardly through the mass of cork, gradually raising the temperature of such mass. The length of time required for the treatment depends considerably upon the size and shape of the molded mass. The completion of the operation can be determined by measuring the temperature in the upper portion of the mass. I have obtained good results by continuing the treatment for about twenty minutes after the temperature of the upper portion of the mass reaches 100° C. My invention makes it possible to very considerably reduce the time and labor required for the manufacture of shaped artificial cork bodies, the treatment by steam as above described requiring a much shorter time and is much less expensive than the ordinary operation of charging the molds and then baking them in hot ovens. The steam also has a beneficial action upon the cork, producing within the cork mass a binder from the resinous materials contained therein; and the expansion of the mass while subjected to heat and while under compression acting to firmly unite the cork particles into a more or less homogeneous porous body having considerable structural strength. After the treatment, the mass is preferably permitted to cool while still in the mold.

The time required for the operation may be somewhat shortened by pre-heating the cork particles, but this I do not ordinarily consider advantageous, as it requires a separate partial-heating operation.

I claim:

1. The herein described method of treating cork which consists in applying pressure to the mass of cork particles or granules in a suitable shaping vessel, and then passing a heating medium therethrough while holding the cork under such compression, substantially as described.

2. The herein described method of forming molded bodies of artificial cork which consists in charging and compressing the mass of cork particles into a shaping vessel or mold, and then passing a heating medium through such mass while it is under compression to bind the cork particles by resinous materials from the cork, substantially as described.

3. The herein described method of treating cork which consists in applying pressure to the mass of cork particles or granules in a suitable shaping vessel, and then passing steam therethrough while the mass of cork is held in compressed condition, substantially as described.

4. The herein described method of treating cork which consists in applying pressure to the mass of cork particles or granules in a suitable shaping vessel, and then passing superheated steam therethrough while it is still under compression to bind the cork particles by resinous materials from the cork, substantially as described.

5. The herein described method of treating cork which consists in preheating cork particles, then applying pressure to the preheated particles in a suitable mold, and then passing a heating medium through the mass while it is still under compression, substantially as described.

6. The herein described method of treating cork which consists in preheating cork particles, then separately compressing the preheated particles in a suitable mold, and then passing steam through the mass while it is still under compression, substantially as described.

7. In the treatment of cork, the step consisting in passing a heating medium through cork particles while said particles are placed and held under applied compression by a mold, substantially as described.

8. In the treatment of cork, the step consisting in passing steam through cork particles while said particles are placed and held under applied compression independently of the pressure of the steam, substantially as described.

9. In the treatment of cork, the step consisting in passing a heating medium through cork particles while said particles are placed and held under applied compression independently of the heating medium, substantially as described.

In testimony whereof, I have hereunto set my hand.

LEONARD W. BERTELSEN, Jr.

ing the cork under such compression, substantially as described.

2. The herein described method of forming molded bodies of artificial cork which consists in charging and compressing the mass of cork particles into a shaping vessel or mold, and then passing a heating medium through such mass while it is under compression to bind the cork particles by resinous materials from the cork, substantially as described.

3. The herein described method of treating cork which consists in applying pressure to the mass of cork particles or granules in a suitable shaping vessel, and then passing steam therethrough while the mass of cork is held in compressed condition, substantially as described.

4. The herein described method of treating cork which consists in applying pressure to the mass of cork particles or granules in a suitable shaping vessel, and then passing superheated steam therethrough while it is still under compression to bind the cork particles by resinous materials from the cork, substantially as described.

5. The herein described method of treating cork which consists in preheating cork particles, then applying pressure to the preheated particles in a suitable mold, and then passing a heating medium through the mass while it is still under compression, substantially as described.

6. The herein described method of treating cork which consists in preheating cork particles, then separately compressing the preheated particles in a suitable mold, and then passing steam through the mass while it is still under compression, substantially as described.

7. In the treatment of cork, the step consisting in passing a heating medium through cork particles while said particles are placed and held under applied compression by a mold, substantially as described.

8. In the treatment of cork, the step consisting in passing steam through cork particles while said particles are placed and held under applied compression independently of the pressure of the steam, substantially as described.

9. In the treatment of cork, the step consisting in passing a heating medium through cork particles while said particles are placed and held under applied compression independently of the heating medium, substantially as described.

In testimony whereof, I have hereunto set my hand.

LEONARD W. BERTELSEN, JR.

DISCLAIMER 1,607,047.—*Leonard W. Bertelsen, Jr.*, Brooklyn, N. Y. METHOD OF MAKING ARTIFICIAL CORK. Patent dated November 16, 1926. Disclaimer filed December 15, 1939, by the assignee, *Armstrong Cork Company*.

Hereby enters this disclaimer to claims 2, 3, 4, 5, 6, 7, 8, and 9 in said specification.

[*Official Gazette January 9, 1940.*]

DISCLAIMER 1,607,047.—*Leonard W. Bertelsen, Jr.*, Brooklyn, N. Y. METHOD OF MAKING ARTIFICIAL CORK. Patent dated November 16, 1926. Disclaimer filed December 15, 1939, by the assignee, *Armstrong Cork Company*.

Hereby enters this disclaimer to claims 2, 3, 4, 5, 6, 7, 8, and 9 in said specification.

*[Official Gazette January 9, 1940.]*